US012517974B2

(12) United States Patent
Bolger et al.

(10) Patent No.: US 12,517,974 B2
(45) Date of Patent: Jan. 6, 2026

(54) METHOD AND DEVICE FOR TRANSLATING BETWEEN STOCHASTIC SIGNALS

(71) Applicant: Analog Devices International Unlimited Company, Limerick (IE)

(72) Inventors: Eoin Seamus Bolger, Leinster (IE); Supriya Balaji Ramachandran, San Jose, CA (US)

(73) Assignee: Analog Devices International Unlimited Company, Limerick (IE)

( * ) Notice: Subject to any disclaimer, the term of this patent is extended or adjusted under 35 U.S.C. 154(b) by 1086 days.

(21) Appl. No.: 17/528,407

(22) Filed: Nov. 17, 2021

(65) Prior Publication Data
US 2022/0414181 A1 Dec. 29, 2022

Related U.S. Application Data

(60) Provisional application No. 63/216,485, filed on Jun. 29, 2021.

(51) Int. Cl.
*G06F 17/14* (2006.01)
*G06N 3/045* (2023.01)
*G06N 3/08* (2023.01)

(52) U.S. Cl.
CPC ............. *G06F 17/14* (2013.01); *G06N 3/045* (2023.01); *G06N 3/08* (2013.01)

(58) Field of Classification Search
CPC .......... G06F 17/14; G06N 3/045; G06N 3/08; G06N 20/00; A61B 5/02416;
(Continued)

(56) References Cited

U.S. PATENT DOCUMENTS 8,620,591 B2 * 12/2013 Wegerich ............. A61B 5/7275
703/11
9,161,700 B2 10/2015 Banet et al.
(Continued)

FOREIGN PATENT DOCUMENTS

CN 106691406 A 5/2017
CN 112806977 A 5/2021
(Continued)

OTHER PUBLICATIONS

Safa Cherif,Effective signal processing methods for robust respiratory rate estimation from photoplethysmography signal (Year: 2019).*
(Continued)

*Primary Examiner* — Mohammad K Islam
(74) *Attorney, Agent, or Firm* — Schwegman Lundberg & Woessner, P.A.

(57) ABSTRACT

A source stochastic signal is deconstructed into its intrinsic components using a decomposition process. The intrinsic components are transformed, and a set of machine learning models are defined and trained to operate with individual ones of the transformed components. The source stochastic signal is thus empirically broken down into underlying components which are then used as learning datasets for the set of machine learning models to predict target components. The target components are then individually predicted and combined to reconstruct a predicted target stochastic signal. The source stochastic signal and the target stochastic signals can be biological signals having a related or common origin, such as photoplethysmogram signals and arterial blood pressure waveforms.

20 Claims, 10 Drawing Sheets

(58) Field of Classification Search
CPC . A61B 5/7267; A61B 5/7278; A61B 5/02108; A61B 5/021; A61B 5/0295; A61B 5/318; A61B 5/6802; A61B 5/681; A61B 5/7257; A61B 5/7264; A61B 8/06; A61B 5/346

See application file for complete search history.

(56) References Cited

U.S. PATENT DOCUMENTS

| | | |
|---|---|---|
| 9,750,464 B2 | 9/2017 | Casale |
| 10,478,127 B2 | 11/2019 | Sampson |
| 10,702,169 B2 | 7/2020 | Gaurav et al. |
| 10,709,424 B2 | 7/2020 | Joseph et al. |
| 10,772,512 B2 | 9/2020 | Klaassen et al. |
| 10,779,738 B2 | 9/2020 | Sullivan et al. |
| 2010/0081946 A1 | 4/2010 | Garudadri et al. |
| 2012/0136224 A1* | 5/2012 | Najarian ............... A61B 5/026 600/301 |
| 2015/0045684 A1 | 2/2015 | Schie et al. |
| 2016/0166160 A1* | 6/2016 | Casale ............... A61B 5/0295 600/480 |
| 2019/0298195 A1 | 10/2019 | De Groot et al. |
| 2020/0015755 A1 | 1/2020 | Zhao et al. |
| 2021/0219852 A1 | 7/2021 | Colburn et al. |
| 2021/0304855 A1* | 9/2021 | Ansari ............... G16H 50/20 |

FOREIGN PATENT DOCUMENTS

| | | |
|---|---|---|
| CN | 112914527 A | 6/2021 |
| CN | 112914528 A | 6/2021 |
| WO | WO-2015070634 A1 | 5/2015 |
| WO | WO 2020/049333 A1 | 3/2020 |
| WO | WO 2020/065403 A1 | 4/2020 |
| WO | WO 2020/198522 A1 | 10/2020 |

OTHER PUBLICATIONS

Athaya et al., An Estimation Method of Continuous Non-Invasive Arterial Blood Pressure Waveform Using Photoplethysmography: A U-Net Architecture-Based Approach. Sensors. 2021, 21(5), 1867. http://doi.org/10.3390/s21051867. 17 pages.

Elgendi, Optimal Signal Quality Index for Photoplethysmogram Signals. Bioengineering. 2016;3:21. 15 pages.

Eom et al., End-To-End Deep Learning Architecture for Continuous Blood Pressure Estimation Using Attention Mechanism. Sensors (Basel). 2020, 20(8). 20 pages.

Ibtehaz et al., PPG2ABP: Translating Photoplethysmogram (PPG) Signals to Arterial Blood Pressure (ABS) Waveforms using Fully Convolutional Neural Networks. arXiv preprint arXiv:2005.01669v1. May 2020. 22 pages.

Kauchee et al., Cuff-Less Blood Pressure Estimation Algorithms for Continuous Health-Care Monitoring. IEEE Trans Biomed Eng. Jun. 2016, 64(4), 12 pages.

Slapničar et al., Blood Pressure Estimation from Photoplethysmogram Using a Spectro-Temporal Deep Neural Network. Sensors (Basel). 2019, 19(15). 17 pages.

"Chinese Application Serial No. 202210756464.X, Office Action mailed Apr. 24, 2025", w/o English Translation, 10 pgs.

* cited by examiner $$x(t) = r_n(t) + \sum_{i=0}^{n} IMF_i(t)$$

Figure 5

METHOD AND DEVICE FOR TRANSLATING BETWEEN STOCHASTIC SIGNALS

CROSS-REFERENCE TO RELATED APPLICATION

This application claims the benefit under 35 U.S.C. § 119(e) of U.S. Provisional Patent Application Ser. No. 63/216,485, entitled "METHOD AND DEVICE FOR TRANSLATING BETWEEN STOCHASTIC SIGNALS," filed on Jun. 29, 2021, which is hereby incorporated by reference herein in its entirety.

FIELD OF DISCLOSURE

The present disclosure relates to the translation of a first stochastic signal to a second stochastic signal. Particularly but not exclusively, the present disclosure relates to the automatic translation of a first stochastic biological signal to a second stochastic biological signal; more particularly, wherein the first stochastic biological signal is a photoplethysmogram or electrocardiogram signal and the second stochastic biological signal is an arterial blood pressure waveform.

BACKGROUND

In current clinical practice, blood pressure measurement is performed either invasively using an intra-arterial catheter, or noninvasively by cuff using either oscillometric or auscultatory methods. Invasive measurement is continuous in nature but carries risk (e.g. infection, bleeding, thrombosis). As such, invasive measurement is used only for critically ill patients and not for the majority of patients with chronic hypertension. Intermittent cuff inflation, the gold standard for blood pressure measurement in chronic hypertension, is non-invasive but does not allow for continuous blood pressure measurement.

A photoplethysmogram (PPG) is a non-invasive circulatory signal related to the pulsatile volume of blood in tissue and is typically collected by pulse oximeters. Blood pressure can be estimated from a PPG signal which can be obtained from a variety of devices. Such devices include mobile or wearable devices such as a smart watch, activity tracker, and the like. However, PPG signals are prone to artefacts that can negatively impact measurement accuracy. Such artefacts can lead to a significant number of misleading diagnoses. These artefacts are more pronounced in PPG signals collected by mobile devices due to increased movement of the device. The accuracy of the reading can vary based on factors such as blood flow, device placement, and stillness of the wearer of the device.

Blood pressure estimation is typically approached as a regression problem, whereby features are extracted from a combination of biological signals, which typically include PPG and electrocardiogram (ECG). Features can also include signals obtained from activity or environment sensors such as accelerometers, pressure sensors, blood oxygen sensors, and the like. These features are then input to a machine learning algorithm in order to predict blood pressure. Examples of machine learning algorithms suitable for blood pressure prediction include linear regression, support vector regression, Bayesian regression, and regression based deep neural networks. Within a regression session, these techniques can predict systolic blood pressure (SBP), diastolic blood pressure (DBP), and/or mean arterial pressure (MAP). Classification methods, such as logistic regression, can also be used to predict categorical indicators such as normal, prehypertension, stage one hypertension, and stage two hypertension.

One of the issues with the above methods is that fine features, like the dicrotic notch and the dicrotic peak, are not always present in PPG signals and are difficult to capture reliably. The extraction of these features is also computationally expensive. A further issue is that motion corrupted signals are hard to salvage. The motion corruption adds error even when fine features, like the dicrotic notch and dicrotic peak, are extracted. Consequently, most existing estimation techniques directly disqualify motion corrupted signals.

SUMMARY OF THE DISCLOSURE

In the present disclosure, a source stochastic signal is deconstructed into its intrinsic components using a decomposition process. The intrinsic components are transformed, and a set of machine learning models are defined and trained to operate with individual ones of the transformed components. The source stochastic signal is thus empirically broken down into underlying components which are then used as learning datasets for the set of machine learning models to predict target components. The target components are then individually predicted and combined to reconstruct a predicted target stochastic signal. The source stochastic signal and the target stochastic signals can be biological signals having a related or common origin, such as photoplethysmogram signals and arterial blood pressure waveforms.

The present disclosure provides a method and device for the translation of stochastic signals, in particular biological signals having a related origin. A source signal is deconstructed into a plurality of deconstructed source components and a transformation is performed on the plurality of deconstructed source components to generate a corresponding plurality of transformed source components. A plurality of machine learning models are used to map the plurality of transformed source components to a plurality of estimated target components. Each of the plurality of machine learning models is trained to map a respective one of the plurality of transformed source components to a respective one of the plurality of estimated target components. An inverse transformation is performed on the plurality of estimated target components to generate a corresponding plurality of transformed target components. A target signal is generated by combining the plurality of transformed target components.

As such, aspects of the present disclosure have a priori information about the composition of the input and output signals which helps to remove any data dependent bias by enabling the machine learning models to learn the underlying components of the signal, not the signal as a whole. The underlying components are less complex than the original target signal, thus making it easier for a machine learning model to learn the transfer function. This allows a simpler and/or smaller model to be employed than if the original target signal was being predicted. The use of a simpler and/or smaller model may help make more efficient use of storage space and consume less power in use, both of which may be particularly beneficial for use on low power devices such as wearable devices, activity trackers, or smart watches.

Further features and aspects of the disclosure are provided in the appended claims.

BRIEF DESCRIPTION OF THE DRAWINGS

The present disclosure will now be described by way of example only with reference to the accompanying drawings in which:

FIG. 5 shows a formula for the summation of transformed target components to generate a target signal according to an embodiment of the present disclosure;

DETAILED DESCRIPTION

Many applications within the domain of signal processing involve stochastic signals having a related or common origin. For example, a first cardiac signal and a second, different, cardiac signal both have a common origin in the contraction-expansion and blood pumping action of various heart chambers. The present disclosure is directed to the automatic translation of stochastic signals having a related or common origin.

The present disclosure decomposes a source stochastic signal into its intrinsic components, e.g., the signal's intrinsic mode functions (IMFs), using a decomposition process such as empirical mode decomposition (EMD). The decomposed components are transformed, e.g., into a suitable time-frequency representation, and a set of machine learning models are defined and trained to operate with individual components rather than the whole source stochastic signal (as is typically the case in prior art methods). Whereas traditional machine learning models simply accept one type of input signal, a benefit of the present disclosure is that each segment of the source stochastic signal is empirically broken down into underlying components which are then used as learning datasets for the set of machine learning models to predict target components. The target components are individually predicted and then combined to reconstruct a predicted target signal.

One aspect of the present disclosure applies the above-described process to the translation of biological stochastic signals for the purpose of cuff-less blood pressure prediction. Using a combination of signal processing and machine learning, non-invasive photoplethysmogram (PPG) or electrocardiogram (ECG) signals are translated to continuous arterial blood pressure (ABP) waveforms. Such ABP waveforms can be used for the further estimation of systolic, diastolic, and central blood pressure values The present disclosure therefore addresses the need for at-home, continuous, and non-invasive blood pressure monitoring that is reliable across population variations. Whilst some prior art techniques address this problem using PPG and ECG signals, the present disclosure accounts for physiologically relevant parameters, extracts both slow-changing and highly dynamic stochastic signal components separately to predict entire ABP waveforms, and only requires PPG measurement for prediction.

Figure 1:
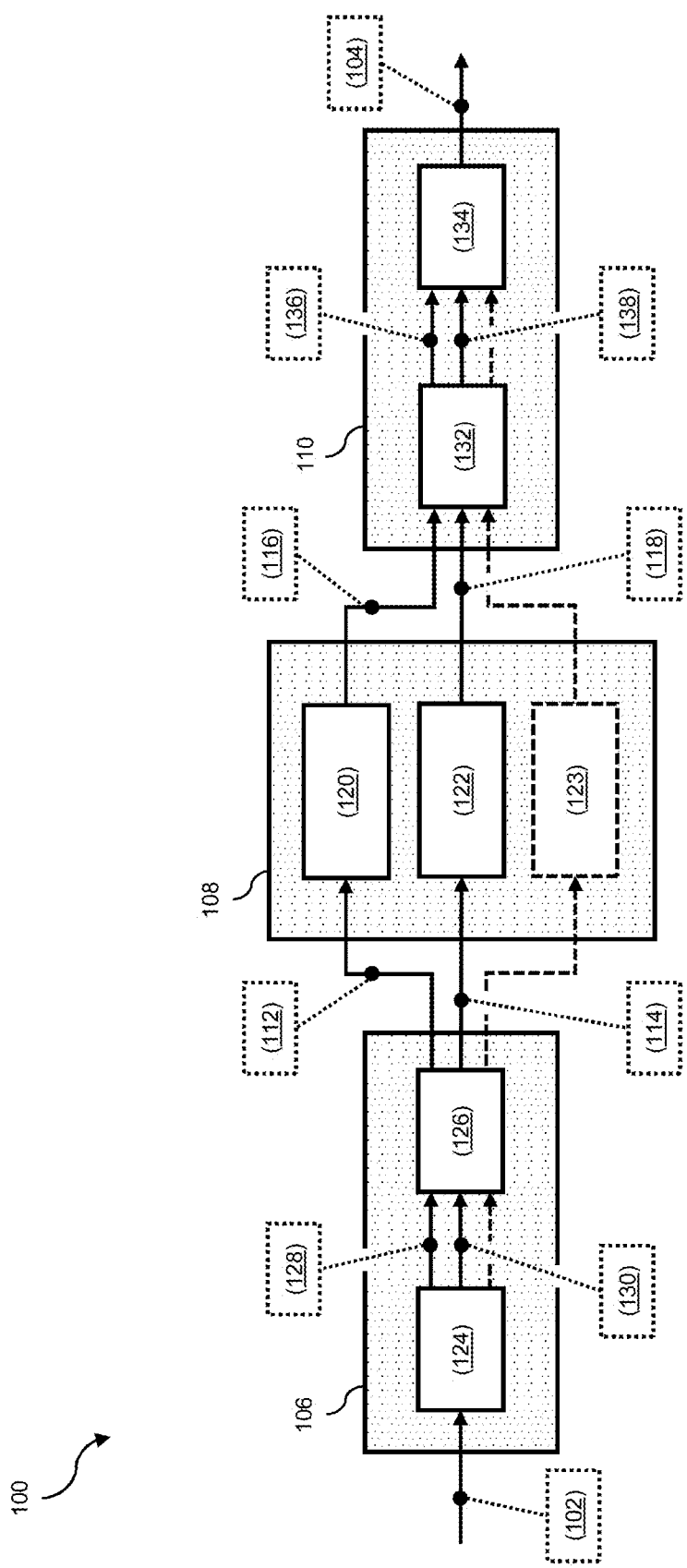
FIG. 1 shows a process for translating a source signal to a target signal according to an aspect of the present disclosure.

FIG. 1 shows a process 100 for translating a source signal 102 to a target signal 104 according to an aspect of the present disclosure. Generally, the process 100 comprises a deconstruction phase 106, a mapping phase 108, and a reconstruction phase 110.

As will be described in more detail below, a plurality of components 112, 114 are generated from the source signal 102 and subsequently mapped to a corresponding plurality of estimated components 116, 118 using a plurality of trained machine learning models 120, 122. The target signal 104 is then generated from the plurality of estimated components 116, 118.

Beneficially, by decomposing the source signal into individual intrinsic components, and training a set of machine learning models on a per-component basis, the present disclosure may help to ensure that the "learnings" of the individual machine learning models are highly nuanced to the level of time and frequency features (which are stochastically allowed to vary). This may allow the target signal to be more accurately estimated by capturing and modelling the highly dynamic stochastic signal components separately rather than capturing and modelling the signal as a whole.

In one example, the source signal 102 and the target signal 104 are both stochastic signals having a related or common origin. Whilst the present disclosure is applicable to the translation of any suitable stochastic signals having a related origin, the present disclosure is primarily directed to biological signals having a related or common origin, and more particularly to biological signals for cuff-less blood pressure prediction. In such settings, the source stochastic signal is a PPG or ECG signal, and the target stochastic signal is an ABP signal. In this instance, the PPG or ECG signal and the ABP signal have a common origin in the contraction-expansion and blood pumping action of various heart chambers. Therefore, throughout the following description, references to a source signal can, in some instances, refer to a PPG or ECG signal whilst references to a target signal can refer to an ABP signal.

The source signal 102 can be obtained from an input signal (not shown). The input signal can be a continuous signal or waveform obtained from a sensor such as a PPG sensor or an ECG sensor. In one embodiment, the source signal 102 comprises an interval of predefined length obtained from the input signal. The predefined length defines a temporal length of the source signal 102 such as 2 seconds, 4 seconds, 8 seconds, and so on. As such, whilst the source signal 102 can represent a discrete signal corresponding to an interval of predefined length, the process and functionality described herein can be repeatedly performed on consecutive intervals obtained from the input signal to reproduce a continuous target signal.

To preserve important signal features whilst removing noise, the input signal may be pre-processed prior to the source signal 102 being obtained. Alternatively, the source signal 102 may be pre-processed after having been obtained. In one example, the pre-processing of a signal comprises at least de-noising the signal. Therefore, the input signal may be de-noised prior to the source signal 102 being obtained.

In one example, de-noising is based on a wavelet decomposition of the signal (i.e., a wavelet decomposition of the input signal or the source signal 102). Beneficially, performing a wavelet decomposition of the signal may help to improve the phase response. This can provide improved efficiency in terms of computational complexity, adaptivity in different signal-to-noise ratio regimes, and non-stationary artefacts. Wavelet based multiresolution analyses can decompose a time series, such as the input signal or the source signal 102, into a set of constitutive series with an explicitly defined hierarchical structure, as shown in FIG. 2.

Figure 2:
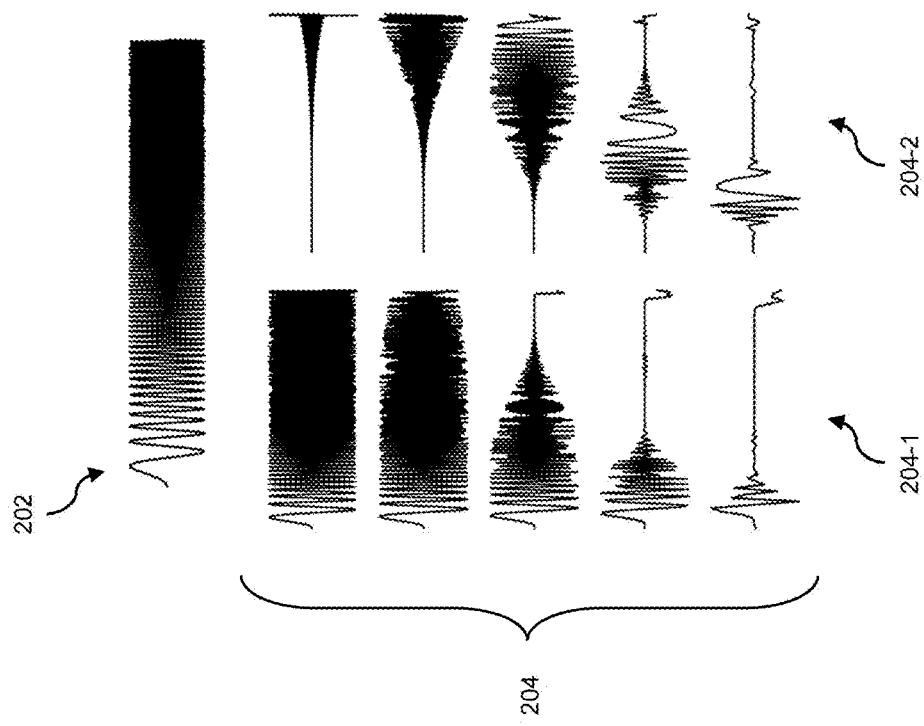
FIG. 2 shows a wavelet based multiresolution analysis for signal de-noising according to an embodiment of the present disclosure.
Figure 2:
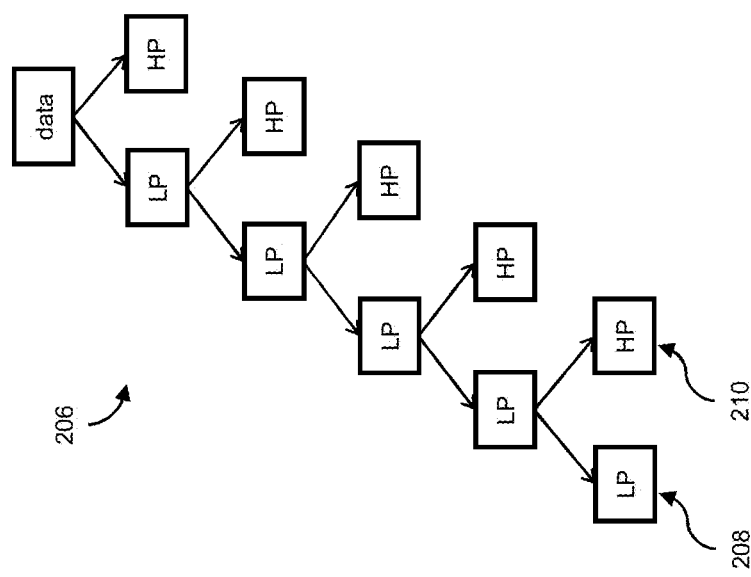

FIG. 2 shows a signal 202 (which could be the input signal or source signal 102) decomposed into a hierarchical structure 204 comprising approximation coefficients 204-1 and detail coefficients 204-2 across multiple levels. Decomposition is performed according to both scale and orientation. Wavelet based multiresolution analyses can be implemented using cascaded filter banks 206 in which the low-pass filters, such as low-pass filter 208, and the high-pass filters, such as high-pass filter 210, satisfy certain specific constraints. Due to the multiscale decomposition, important signal features may be preserved whilst removing noise.

Referring once again to FIG. 1, after the input signal or source signal 102 has been optionally pre-processed, the plurality of components 112, 114 are generated from the source signal 102 in the deconstruction phase 106. The deconstruction phase 106 corresponds to a transformation process which generates the plurality of components 112, 114 from the source signal 102. Consequently, the plurality of components 112, 114 may be alternatively referred to as a plurality of transformed components. Generally, the transformation process performed during the deconstruction phase 106 can correspond to any suitable transformation process, or transformation function, which has a corresponding inverse transformation process, or function, that can be performed during the reconstruction phase 110.

Thus, the present disclosure empirically breaks down the source signal 102 into underlying components, i.e. plurality of components 112, 114. These underlying source components are mapped to corresponding underlying target components which can be reconstructed to form the target signal. By deconstructing and mapping individual components of a signal, rather than mapping the raw source signal, more nuanced characteristics and features of the source signal can be modelled and subsequently reconstructed in the target signal. The present disclosure may therefore provide a more accurate and robust process for translating between stochastic signals.

In one aspect, the transformation process performed during the deconstruction phase 106 corresponds to a deconstruction 124 and a transformation 126. The deconstruction 124 deconstructs the source signal 102 into a plurality of deconstructed source components 128, 130, and the transformation 126 of the plurality of deconstructed source components 128, 130 generates a corresponding plurality of transformed source components, which correspond to the plurality of components 112, 114. That is, the first component 112 and the second component 114 of the plurality of components 112, 114 can be generated by first decomposing, or deconstructing, the source signal 102 into a first deconstructed source component 128 and a second deconstructed source component 130. The first component 112 can be generated from the first deconstructed source component 128 using a transformation function, and the second component 114 can be generated from the second deconstructed source component 130 using the transformation function. The transformation 126 can thus correspond to a specific transformation function applied to the decomposed, or deconstructed, source components produced during deconstruction 124.

Optionally, the transformation process further comprises generating a third component from the source signal. In one example, the third component is generated from the source stochastic signal by the deconstruction 124 and the transformation 126 steps described above in relation to the first component 112 and the second component 114. That is, the deconstruction 124 can produce a third deconstructed source component, and the third component is generated by the transformation 126 of the third deconstructed source component.

In one particular aspect, the deconstruction 124 of the source signal 102 into the plurality of deconstructed source components 128, 130 is performed using an empirical mode decomposition (EMD), and the transformation 126 of the plurality of deconstructed source components 128, 130 is performed using a Hilbert transform.

Empirical mode decomposition decomposes a source signal into a set of completely data-adaptive deconstructed components. The deconstructed components can also be referred to as components, decomposed components, basis functions, or intrinsic mode functions (IMFs). The basic theory of EMD is that any data set is essentially composed of a finite number of different, simple oscillatory modes (i.e. components or IMFs). Beneficially, and in contrast to methods such as the Fourier transform and wavelet-based transforms, EMD has no a-priori defined basis. Therefore, EMD can deal effectively with both non-linear and non-stationary data. This may be particularly useful for stochastic biological signals such as PPG or ECG signals.

Figure 3:
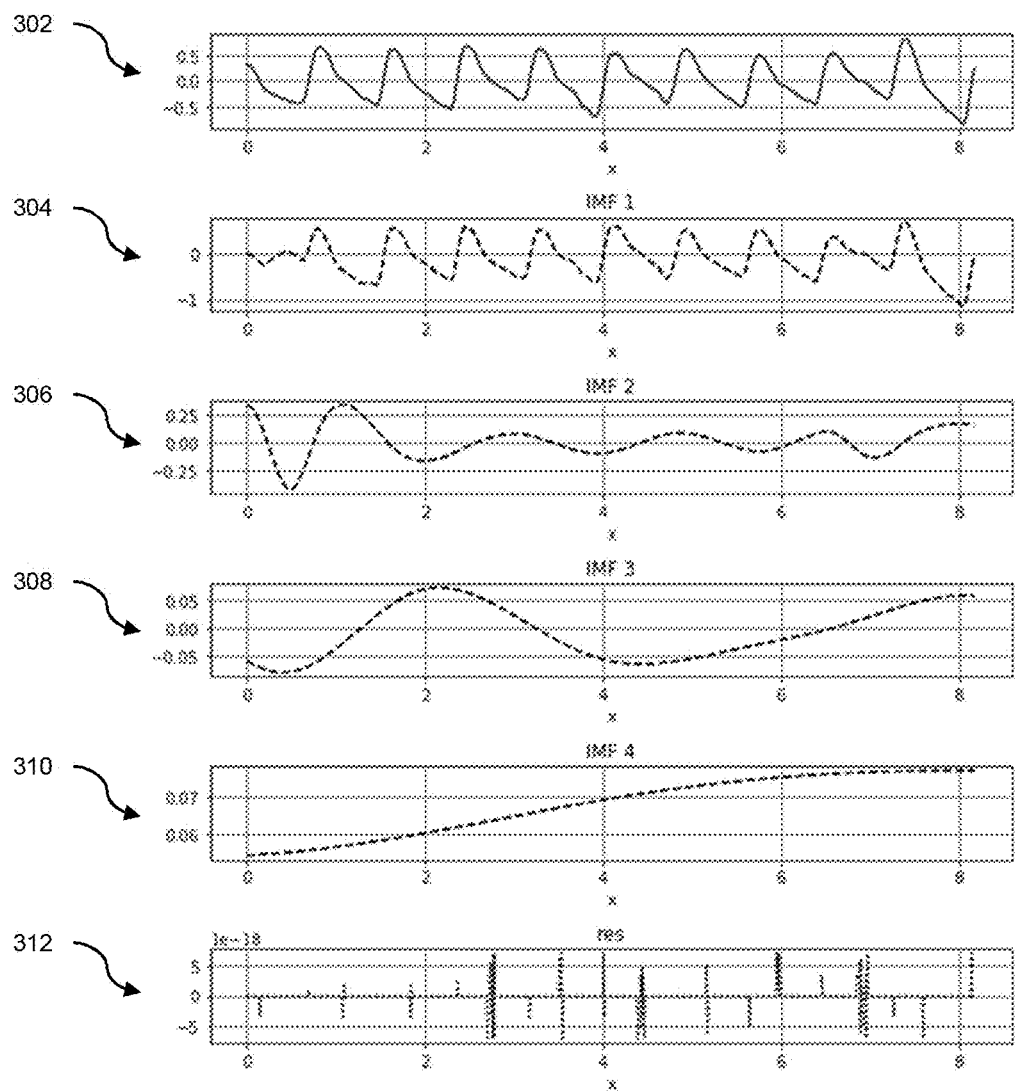
FIG. 3 shows an example empirical mode decomposition according to an embodiment of the present disclosure.

FIG. 3 shows an example of empirical mode decomposition of a signal 302. The signal 302 can be considered equivalent to the source signal 102 shown in FIG. 1 and can be a stochastic signal such as a PPG signal or an ECG signal.

In FIG. 3, the signal 302 has been decomposed using EMD into a first decomposed or deconstructed component 304, a second decomposed or deconstructed component 306, a third decomposed or deconstructed component 308, and a fourth decomposed or deconstructed component 310. The residuals 312 are also shown. Throughout the present disclosure, the components generated from EMD are taken to include residuals.

Referring once again to FIG. 1, during the deconstruction phase 106, a transformation 126 of the plurality of deconstructed source components 128, 130 can be performed to generate a corresponding plurality of transformed source components, which can correspond to the plurality of components 112, 114 output from the deconstruction phase 106. In embodiments where an EMD is used for the deconstruction 124 of the source signal 102, then the transformation 126 of the plurality of deconstructed source components 128, 130 can comprise a Hilbert transform of each of the deconstructed source components (i.e. a Hilbert transform is performed on the first deconstructed source component 128 and a Hilbert transform is independently performed on the second deconstructed source component 130). As is known, the Hilbert transform forms the analytic signal—the complex time signal corresponding to the spectral content of the positive frequency axis. The Hilbert transform thus allows for the calculation of instantaneous attributes of the deconstructed source components, especially the envelope amplitude and instantaneous frequency.

In an alternative embodiment, the transformation process performed at the deconstruction phase 106 corresponds to a Hilbert-Huang transform (HHT) of the source signal 102 such that the plurality of components 112, 114 are generated by performing an HHT on the source signal 102.

The HHT has been applied to numerous scientific investigations, such as biomedical signals processing, geophysics, image processing, structural testing, fault diagnosis, nuclear physics and so on. Like other spectral techniques, the HHT enables the amplitude and instantaneous frequency to be represented in a three-dimensional plot, or image, in which the amplitude is the height in the time-frequency plane.

As such, when either a Hilbert transform or a HHT is used, the transformed source components, such as the first component 112 and the second component 114, are energy-frequency-time distributions which can be represented as a 3-dimensional vector or image. The use of the Hilbert transform or the HHT therefore enables the components to be represented with a high-resolution in time and frequency which may help to improve the accuracy of the signal that is being reconstructed.

After the plurality of components 112, 114 (i.e. the plurality of transformed source components) have been generated at the deconstruction phase 106, the plurality of components 112, 114 are mapped to a corresponding plurality of estimated components 116, 118 at the mapping phase 108. The plurality of estimated components 116, 188 can be alternatively referred to as a plurality of estimated target components.

Prediction models, e.g. first trained machine learning model 120 and second trained machine learning model 122, are used to predict a set estimated target components, such as the plurality of estimated components 116, 118, from a set of transformed source components, such as components 112, 114. In one example implementation, the prediction models further include a third trained machine learning model 123 operable to predict a third estimated component from a third component.

The prediction models are trained to map from a component of a source signal to a corresponding component of a target signal. That is, a single prediction model, e.g., a single machine learning model or neural network, can be trained using a dataset of known source signals and corresponding target signals (such as a dataset of PPG/ECG signals with known corresponding ABP waveforms). The PPG/ECG signals and corresponding ABP waveforms can be deconstructed into individual components such that a prediction model can be trained to predict from an individual PPG/ECG component to a corresponding ABP component (e.g., trained to predict a first component or IMF of an ABP waveform from a first component or IMF of a PPG waveform). As stated previously, training a set of machine learning models on a per-component basis may help to ensure that the "learnings" of the individual machine learning models are highly nuanced to the level of time and frequency features. This may allow the target signal to be more accurately estimated by capturing and modelling the highly dynamic stochastic signal components separately rather than capturing and modelling the raw source and target signals. Furthermore, the underlying components are less complex than the original signals, thus making it easier for a prediction model to learn the transfer function (i.e. learn to map from a source component to an estimated target component). This allows a simpler and/or smaller model to be employed than if the original target signal was being predicted from the raw source signal. This may be particularly beneficial when the present disclosure is embodied in a low-energy device such as a wearable device.

As will be described in more detail below, the prediction models used during the mapping phase 108 can correspond to any suitable machine learning model trained to predict an estimated target component from a source component. In one example implementation, the first trained machine learning model 120 and the second trained machine learning model 122 are trained encoder-decoder neural networks such as trained U-net models or trained VGG models. Other suitable neural network architectures include Language Translation Networks, Recurrent Neural Networks, Convolutional Neural Networks, and the like. As such, the prediction models can be any suitable trained machine learning models or trained deep learning models.

A single machine learning model is trained to predict a respective estimated target component from a respective source component. For example, if the source signal is transformed into four source components, then a first machine learning model is trained to map the first source component to a first estimated target component, a second machine learning model is trained to map the second source component to a second estimated target component, and so on. Optionally, predicting an estimated target component can involve more than one source component being provided to a machine learning model. In such cases, mapping a first component to a first estimated component comprises providing both the first component and a second component as inputs to a first trained machine learning model. In addition, or alternatively, mapping the second source component to a second estimated target component comprises providing both the first source component and the second source component as inputs to a second trained machine learning model.

The trained machine learning models can be trained using any suitable dataset specific to the underlying task and training approach specific to the underlying machine learning algorithm used. In one example implementation described below, the machine learning models comprise U-net models trained on the MIMIC-III dataset.

Figure 4:
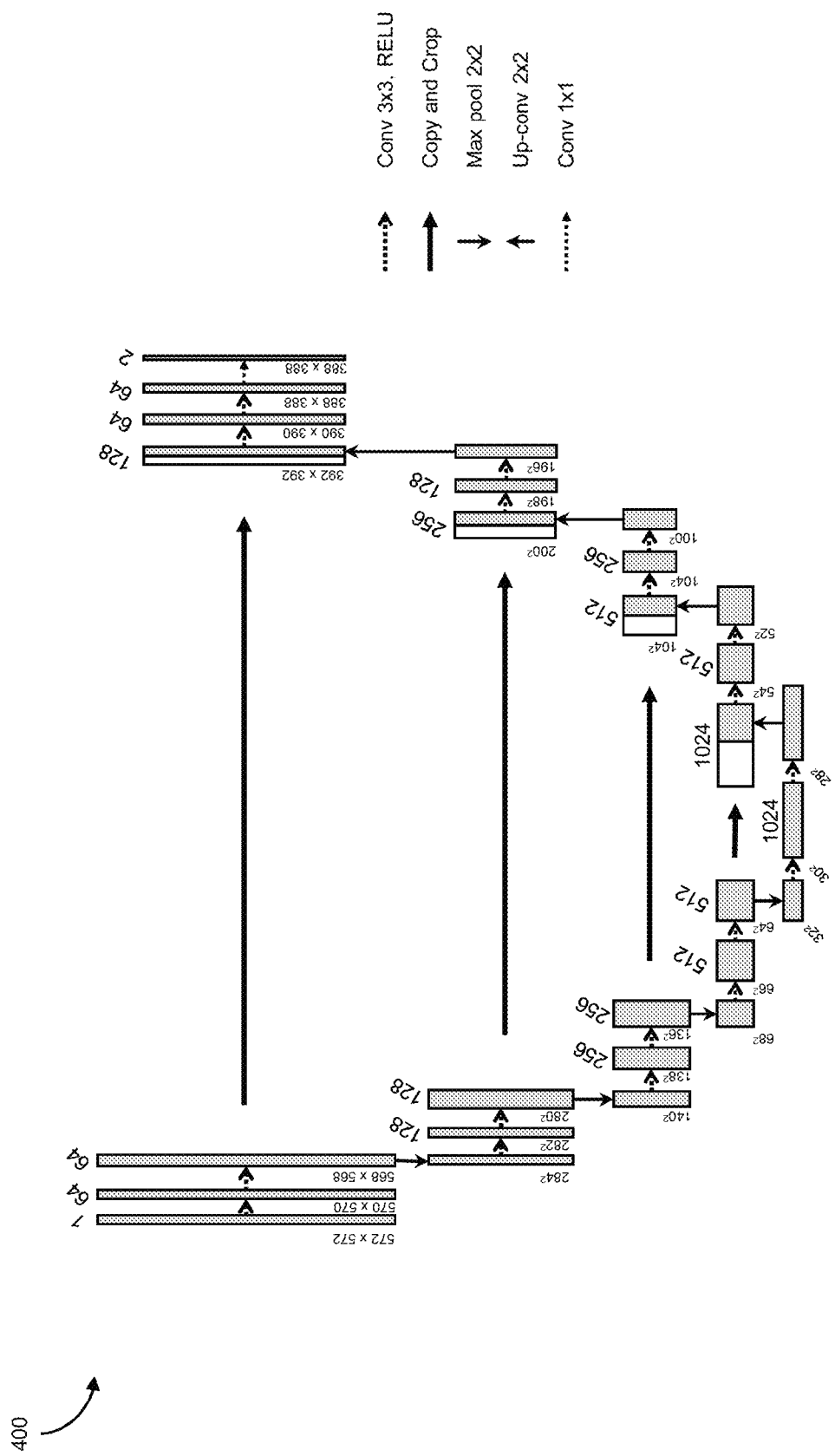
FIG. 4 shows an example U-net architecture suitable for use with embodiments of the present disclosure.

FIG. 4 shows an example U-net architecture 400 suitable for use with the present disclosure. The example U-net architecture 400 is based on the VGG-16 architecture and uses a dedicated decoder network as opposed to a minimal decoder as used in a fully convolutional network (FCN). U-nets utilise un-pooling layers to recover spatial information and make extensive use of skip connections. These connections make use of spatial information in the encoding path and concatenations of feature maps.

The MIMIC-III database is a large, freely available database comprising deidentified health-related data associated with over forty thousand patients who stayed in critical care units of the Beth Israel Deaconess Medical Center between 2001 and 2021. The U-net models are trained on the MIMIC-III Waveform Database Matched Subset, which contains 22,317 waveform records, and 22,247 numeric records, for 10,282 distinct ICU patients. These recordings typically include digitised signals such as ECG, ABP, respiration, and PPG. The recordings also contain measurements such as heart rate, oxygen saturation, and systolic, mean, and diastolic blood pressure. The database is a subset of the MIMIC-III Waveform Database, representing those records for which the patient has been identified, and their corresponding clinical records are available in the MIMIC-III Clinical Database. The training data taken from the MIMIC-III Waveform Database Matched Subset includes training instances corresponding to PPG signals and training targets corresponding to ABP signals. Both the training instances and the training targets comprise 14,896 waveforms of length 1024. In the currently described implementation, the training instances and training targets are decomposed into four transformed basis functions and accompanying residuals using a suitable transformation process such as the Hilbert-Huang transform. In alternative implementations, the number of transformed basis functions could be greater than or less than four and other suitable transformation processes can be used. Five U-net neural networks are trained to map between the five underlying signal components, i.e. map between the training instances (PPG components or basis functions) and the training targets (ABP components or basis functions). For example, the first U-net neural network is trained to map from the first PPG basis function to the first ABP basis function.

The skilled person will appreciate that the number of neural networks, or more generally machine learning models, correspond to the number of decomposed components. As such, in alternative implementations, the number of neural networks, or machine learning models, could be greater than or less than five. In the presently described implementation, the standard U-net architecture as shown in FIG. 4 is used. The skilled person will appreciate that alternative U-net architectures other than that shown in FIG. 4 could also be used. The U-net neural network is trained using a mean absolute error loss using the ADAM optimiser. The training process is performed over 100 epochs with a batch size of 255 (with shuffling) and 30% of the training data being used for validation.

Referring once again to FIG. 1, after the plurality of estimated components 116, 118 have been predicted at the mapping phase 108, the target signal 104 is generated at the reconstruction phase 110.

Generally, a second transformation process or function, corresponding to the inverse of the transformation process or function used during the deconstruction phase 106, is applied at the reconstruction phase 110 to generate the target signal 104 from the plurality of estimated components 116, 118. In implementations where a third machine learning model 123 is used, the target signal 104 is generated from the first estimated component 116, the second estimated component 118, and the third estimated component.

In example implementation, the inverse transformation process performed during the reconstruction phase 110 corresponds to a transformation 132 and a reconstruction 134. The transformation 132 transforms the plurality of estimated components 116, 118 to a corresponding plurality of transformed target components 136, 138. The reconstruction 134 of the plurality of transformed target components 136, 138 is performed to generate the target signal 104. The first transformed target component 136 can be generated from the first estimated component 116 using a transformation function, and the second transformed target component 138 can be generated from the second estimated component 118 using the transformation function. The transformation 132 can thus correspond to a specific transformation function applied to the estimated target components. In one example, the transformation function applied at the transformation 132 is the inverse of the transformation function applied at the transformation 126. In an implementation where a Hilbert transform is performed at the transformation 126, then the inverse Hilbert transform is performed at the transformation 132.

Figure 5:
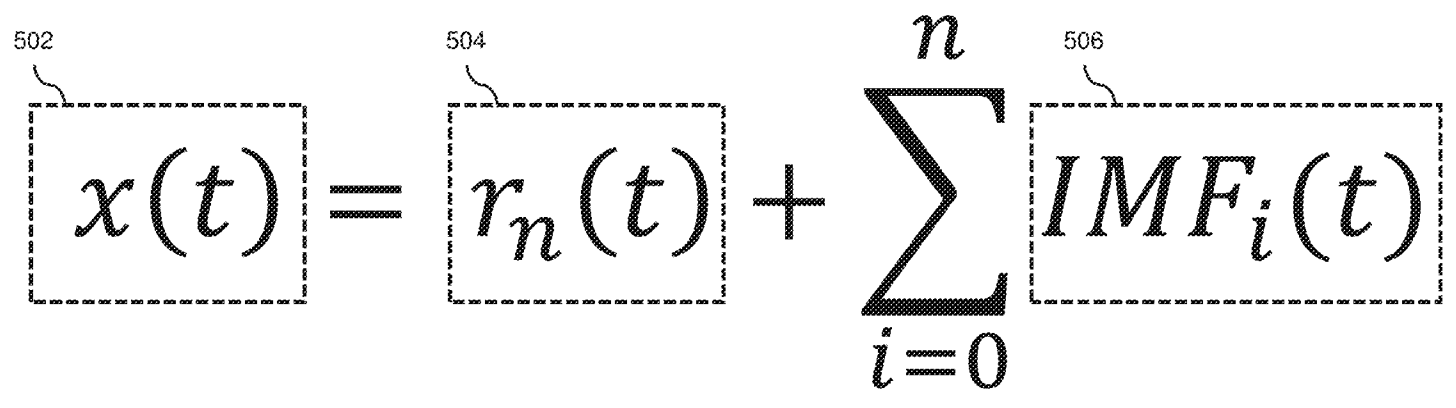

The reconstruction 134 of the plurality of transformed target components 136, 138 combines the plurality of transformed target components 136, 138 to generate the target signal 104. Any suitable method for combining the plurality of transformed target components 136, 138 to generate the target signal 104 can be used. In one example implementation, the target signal 104 can be reconstructed by taking a summation of the plurality of transformed target components 136, 138 (which preferably include the corresponding residuals). FIG. 5 shows an example summation according to this implementation. The target signal 502 is determined as the sum of the plurality of transformed target components which include the residuals 504 and n individual transformed target components 506.

Optionally, the target signal 502 may be output for viewing by a user or further analysis. For example, the target signal 502 can be output to a display of a device or wearable device. Alternatively, the target signal 502 can be transmitted to an external device for storage or further analysis/processing.

Beneficially, the present disclosure uses trained machine learning models to predict components of a decomposition of a target signal from corresponding components of a decomposition of a source signal. Both the source signal and the target signal can be stochastic signals having a related or common origin. The present disclosure may help improve the accuracy and quality of the target stochastic signal being predicted. Furthermore, the present disclosure may provide improved noise handling since specific noise components are associated with components of the decomposed source stochastic signal. That is, the decomposition of the source stochastic signal into a set of components may provide a native noise removal advantage for probabilistic noise. This may help remove the noise that the machine learning models need not learn, i.e. the underlying noise of the common origin, not just the noise occurring as a result of measurement. Moreover, because the decomposed signals are far simpler than the source stochastic signal, the present disclosure may provide improved phase prediction relative to the phase of the "true" target stochastic signal.

Figure 6:
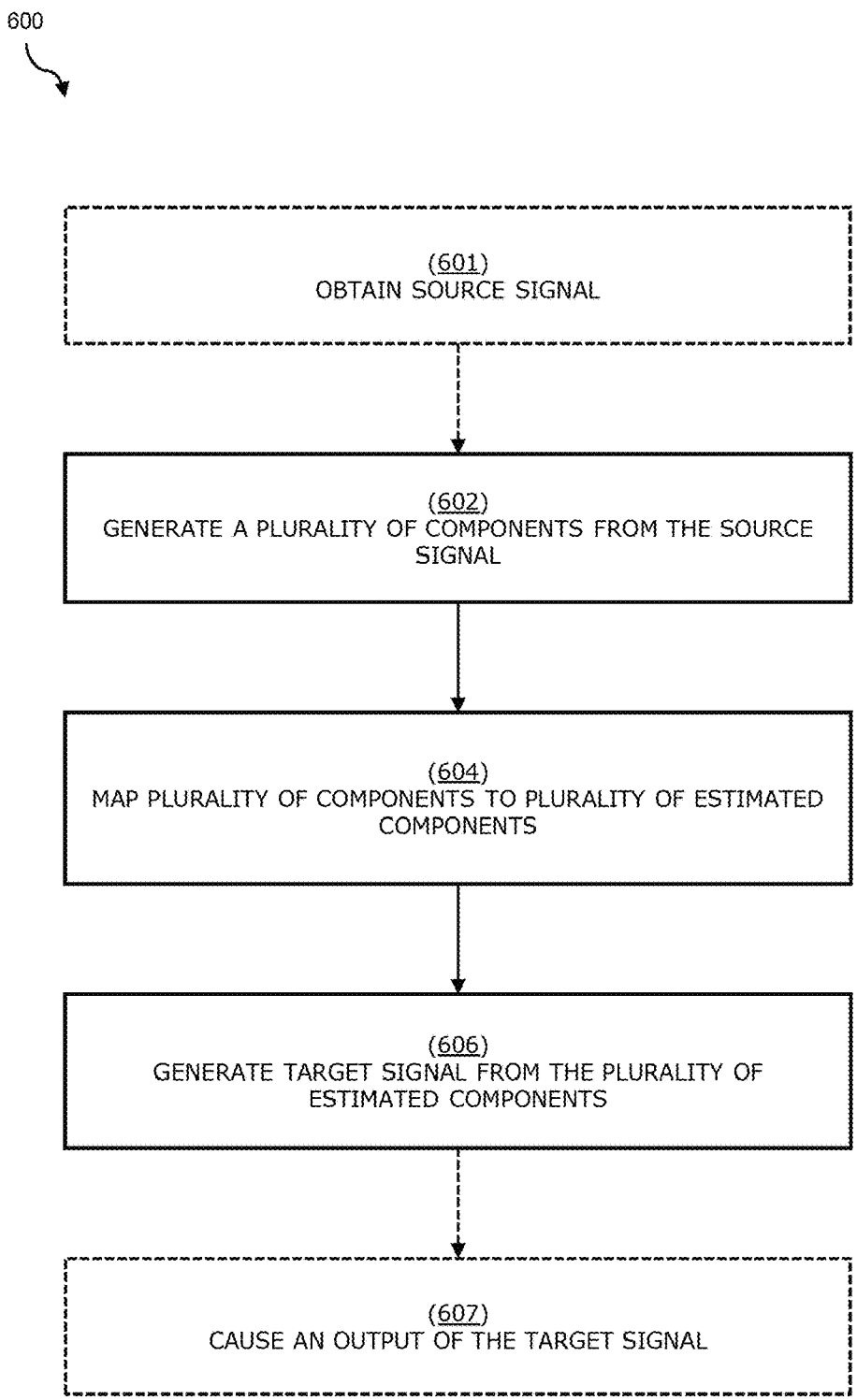
FIG. 6 shows a method for translating a source signal to a target signal according to an aspect of the present disclosure.

FIG. 6 shows a method 600 for translating a source signal to a target signal according to an aspect of the present disclosure. Method 600 comprises steps 602, 604, 606 and optionally comprises steps 601, 607.

Optionally, method 600 begins by obtaining 601 a source signal, such as source signal 102 shown in FIG. 1. In one example, obtaining 601 the source signal comprising obtaining a source photoplethysmogram (PPG) signal. As stated in more detail above, the source signal can be obtained from an input signal which can be a continuous signal or waveform obtained from a sensor such as a PPG sensor or an ECG sensor. In one example, the source signal comprises an interval of predefined length obtained from the input signal. To preserve important signal features whilst removing noise, the input signal may be pre-processed prior to the obtaining 601. Alternatively, the source signal may be pre-processed after the obtaining 601. The pre-processing of a signal may comprise at least de-noising the signal.

Method 600 comprises generating 602 a plurality of components from the source signal. In one example, generating 602 the plurality of components from the source signal comprises transforming, using a first transformation process, the source signal into a plurality of components. In another example, generating 602 the plurality of components from the source signal comprises transforming, using a first transformation process, the source PPG signal into a plurality of PPG components.

Figure 7:
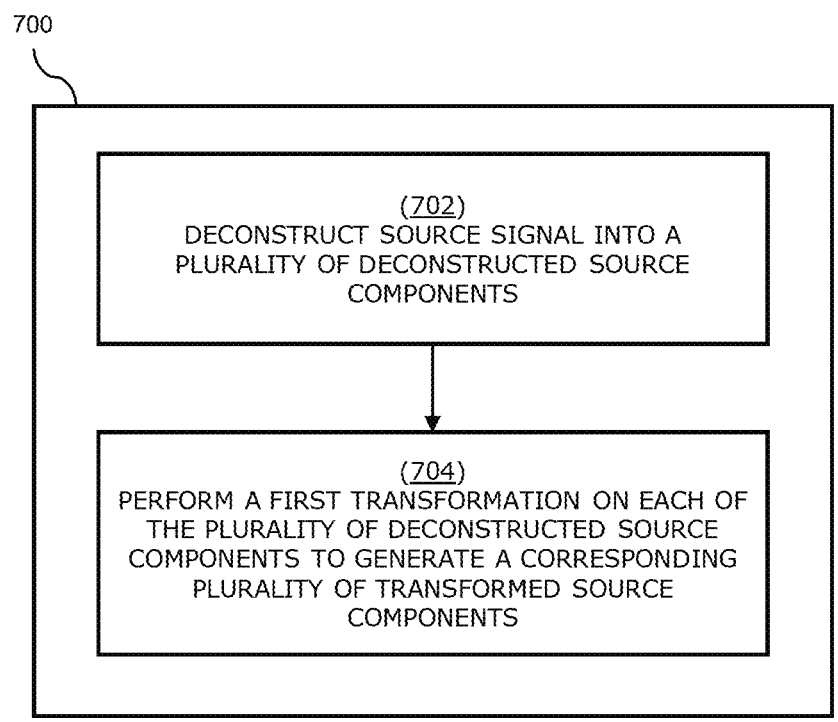
FIG. 7 shows a process for transforming a source signal to a plurality of components according to an embodiment of the present disclosure.

FIG. 7 shows a transformation process 700 that can be performed as part of the generating 602 according to one example implementation.

Transformation process 700 comprises deconstructing 702 the source signal into a plurality of deconstructed source components. In an example, deconstructing 702 comprises the performance of an empirical mode decomposition (EMD) of the source signal to generate the plurality of deconstructed source signals.

Transformation process 700 further comprises performing 704 a first transformation on each of the plurality of deconstructed source components to generate a corresponding plurality of transformed source components. In implementations where an EMD is used for the deconstructing 702, then the performing 704 of the first transformation to transform the plurality of deconstructed source components comprises the use of a Hilbert transform as the first transformation. As such, a Hilbert transform is applied to each of the deconstructed source components in the plurality of deconstructed target components.

Referring once again to FIG. 6, in an alternative example, the first transformation process performed at the generating 602 step corresponds to a Hilbert-Huang transform. Alternatively, any suitable transformation process can be used to deconstruct the source signal into a plurality of components. The transformation process used to deconstruct the source signal may have a corresponding inverse transformation process that can be used to recover or reconstruct the target signal.

Method 600 further comprises mapping 604, using a plurality of trained machine learning models, the plurality of components to a corresponding plurality of estimated components. Each of the plurality of trained machine learning models may be trained to map a respective one of the plurality of components to a respective one of the plurality of estimated components. As such, mapping 604 may comprise predicting, using a first trained machine learning model, a first estimated component from a first component of the plurality of components, and predicting, using a second trained machine learning model, a second estimated component from a second component of the plurality of components.

As described in more detail above, the machine learning models used can correspond to any suitably trained machine learning model such as a trained U-net mode or trained VGG model. Other suitable neural network architectures include Language Translation Networks, Recurrent Neural Networks, Convolutional Neural Networks, and the like. An example training process of a U-net model suitable for use with the present disclosure is described above in relation to FIG. 4.

In one example implementation, mapping 604 comprises predicting, using a plurality of prediction models, a plurality of predicted arterial blood pressure (ABP) components from the plurality of PPG components. Each prediction model of the plurality of prediction models is operable to map from one or more PPG components of the plurality of PPG components to a predicted ABP component of the plurality of predicted ABP components.

Method 600 further comprises generating 606 the target signal from the plurality of estimated components. In one example, generating 606 the target signal from the plurality of estimated components comprises transforming, using a second transformation process, the plurality of estimated components into the target signal. In another example, generating 606 the target signal from the plurality of estimated components comprises transforming, using a second transformation process, the plurality of predicted ABP components into a target ABP signal.

Figure 8:
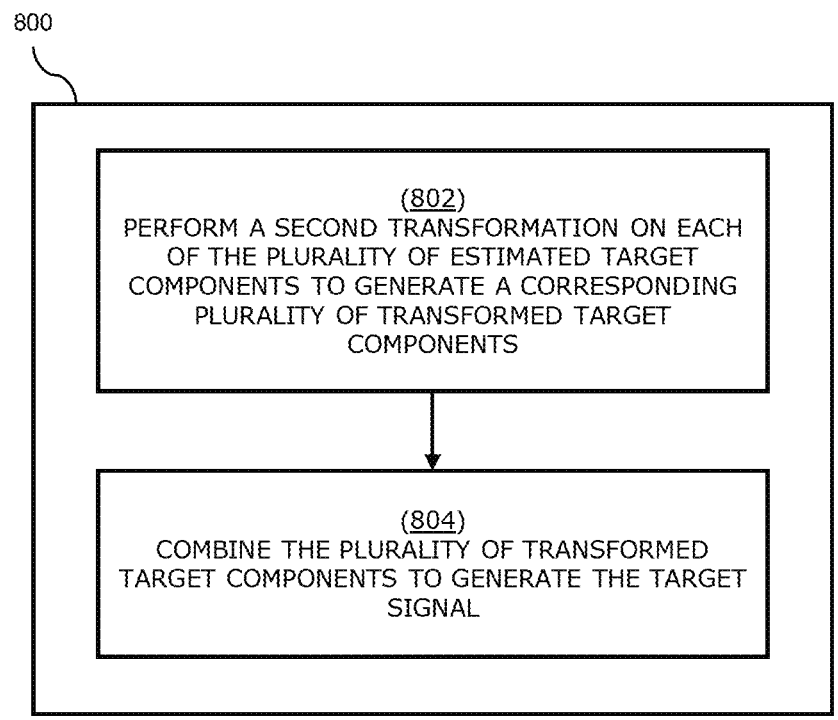
FIG. 8 shows a process for transforming a plurality of estimated components to a target signal according to an embodiment of the present disclosure.

FIG. 8 shows a transformation process 800 that can be performed as part of the generating 606 according to one particular implementation.

Transformation process 800 comprises performing 802 a second transformation process on each of the plurality of estimated target components to generate a plurality of transformed target components. The second transformation process may be an inverse of the first transformation process performed during the deconstruction of the source signal (e.g., the first transformation process performed at step 704 of FIG. 7). In implementations where the Hilbert transform is used as the first transformation process, the inverse Hilbert transform can be used as the second transformation process.

Transformation process 800 further comprises combining 804 the plurality of transformed target components to generate the target signal. As shown in FIG. 5 and described in more detail above, combining 804 the plurality of transformed target components can correspond to a summation of the estimated target components (including residuals) to generate the target signal.

Referring once again to FIG. 6, in an alternative implementation, the second transformation process performed at the generating step 606 corresponds to an inverse Hilbert-Huang transform when the first transformation process performed at the generating step 602 corresponds to a Hilbert-Huang transform.

Optionally, method 600 comprises causing 607 an output of the target signal. In one example, causing 607 an output of the target signal comprises causing an output of the target ABP signal. Additionally or alternatively, causing 607 an output of the target signal can include causing the target signal to be output to a display of a device or wearable device. Alternatively, causing 607 an output of the target signal can include causing the target signal to be transmitted to an external device, e.g., for further processing.

Figure 9:
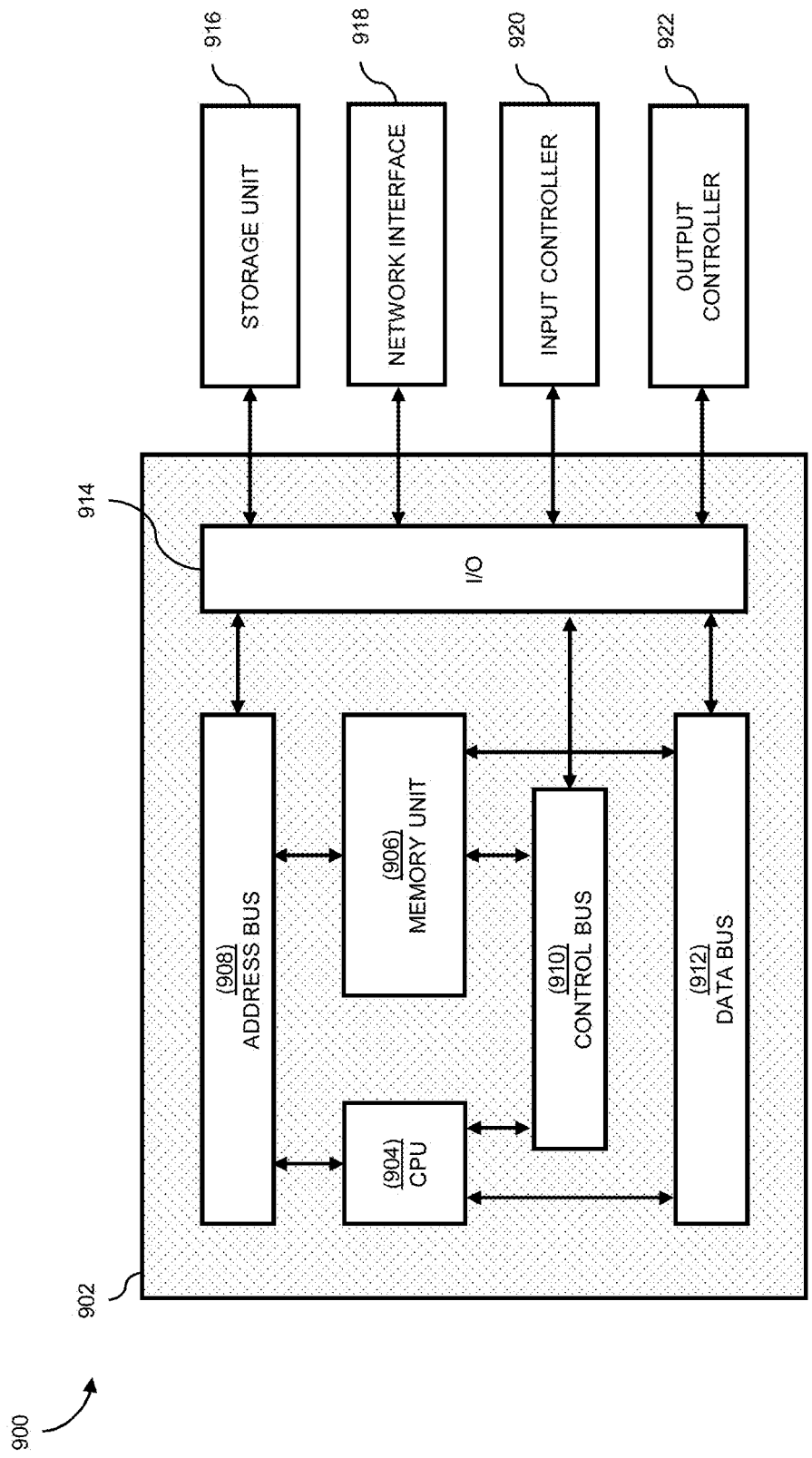
FIG. 9 shows a device suitable for executing embodiments of the present disclosure.

A device suitable for executing the above described aspects of the present disclosure is shown in FIG. 9. FIG. 9 shows a block diagram of an example computing system.

A computing system 900 can be configured to perform any of the operations disclosed herein. Computing system includes one or more computing device(s) 902. The one or more computing device(s) 902 of the computing system 900 comprise one or more processors 904 and a memory 906. The one or more processors 904 can be any general-purpose processor(s) configured to execute a set of instructions (i.e., a set of executable instructions). For example, the one or more processors 904 can be one or more general-purpose processors, one or more field programmable gate array (FPGA), and/or one or more application specific integrated circuits (ASIC). In one example, the one or more processors 904 include one processor. Alternatively, the one or more processors 904 include a plurality of processors that are operatively connected. The one or more processors 904 are communicatively coupled to the memory 906 via an address bus 908, a control bus 910, and a data bus 912. The memory 906 can be a random-access memory (RAM), a read-only memory (ROM), a persistent storage device such as a hard drive, an erasable programmable read-only memory (EPROM), and/or the like. The one or more computing device(s) 902 further comprise an I/O interface 914 communicatively coupled to the address bus 908, the control bus 910, and the data bus 912.

The memory 906 can store information that can be accessed by the one or more processors 904. For instance, memory 906 (e.g., one or more non-transitory computer-readable storage mediums, memory devices) can include computer-readable instructions (not shown) that can be executed by the one or more processors 904. The computer-readable instructions can be software written in any suitable programming language or can be implemented in hardware. Additionally, or alternatively, the computer-readable instructions can be executed in logically and/or virtually separate threads on the one or more processors 904. For example, the memory 906 can store instructions (not shown)

that when executed by the one or more processors 904 cause the one or more processors 904 to perform operations such as any of the operations and functions for which the computing system 900 is configured, as described herein. In addition, or alternatively, the memory 906 can store data (not shown) that can be obtained, received, accessed, written, manipulated, created, and/or stored. The data can include, for instance, the data and/or information described herein in relation to FIGS. 1 to 8. In some implementations, the computing device(s) 902 can obtain from and/or store data in one or more memory device(s) that are remote from the computing system 900.

The computing system 900 further comprises a storage unit 916, a network interface 918, an input controller 920, and an output controller 922. The storage unit 916, the network interface 918, the input controller 920, and the output controller 922 are communicatively coupled to the computing device(s) 902 via the I/O interface 914.

The storage unit 916 is a computer readable medium, preferably a non-transitory computer readable medium or non-transitory machine readable medium, comprising one or more programs, the one or more programs comprising instructions which when executed by the one or more processors 904 cause the computing system 900 to perform the method steps of the present disclosure. Alternatively, the storage unit 916 is a transitory computer readable medium. The storage unit 916 can be a persistent storage device such as a hard drive, a cloud storage device, or any other appropriate storage device.

The network interface 918 can be a Wi-Fi module, a network interface card, a Bluetooth module, and/or any other suitable wired or wireless communication device. In one example, the network interface 918 is configured to connect to a network such as a local area network (LAN), or a wide area network (WAN), the Internet, or an intranet.

Figure 10:
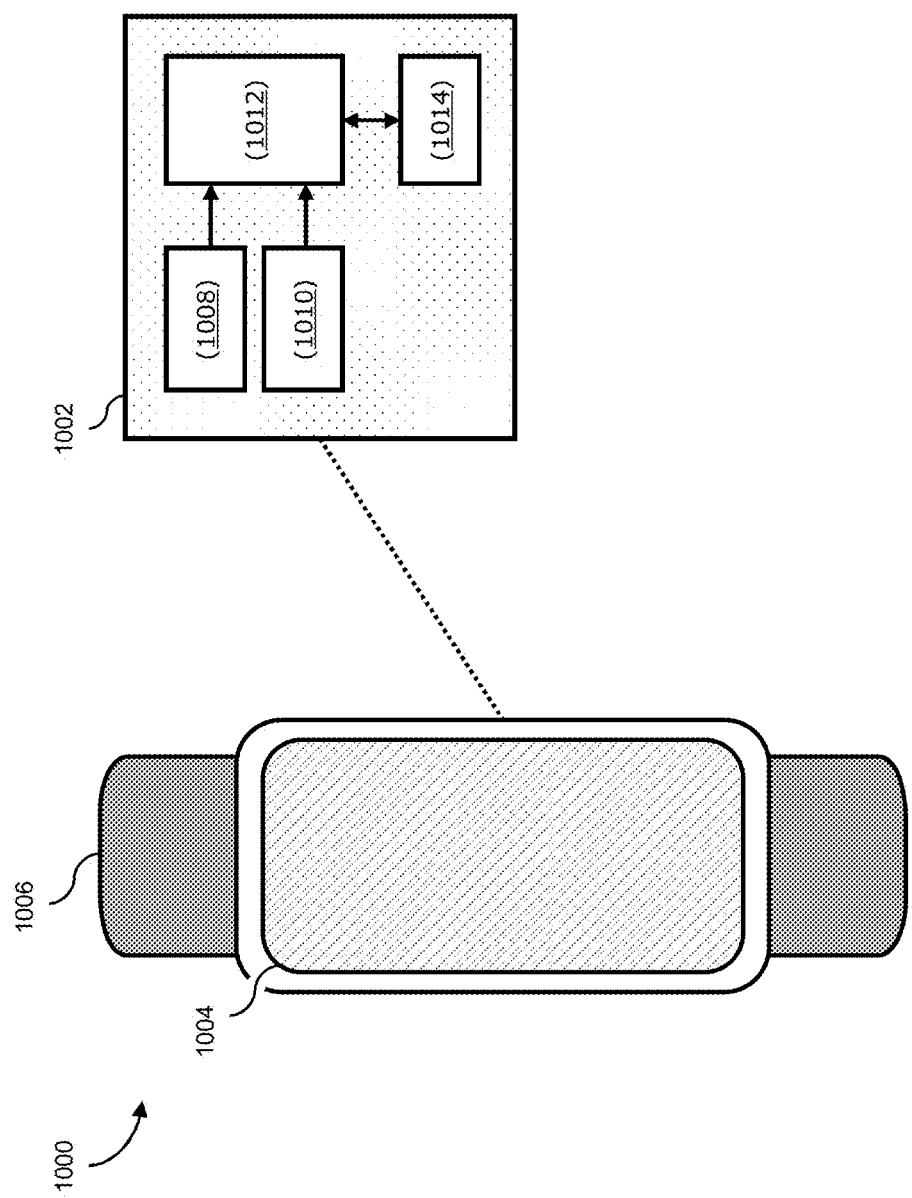
FIG. 10 shows a wearable device suitable for executing embodiments of the present disclosure.

A wearable device suitable for executing the above described aspects of the present disclosure is shown in FIG. 10. In one example, the wearable device is a device for cuff-less blood pressure estimation.

FIG. 10 shows a wearable device 1000 comprising a computing environment 1002, a screen 1004, and a band 1006. The computing environment 1002 comprises a first sensor 1008, a second sensor 1010, one or more processors 1012, and a memory 1014. It is to be noted that the computing environment 1002 shown in FIG. 10 is deliberately simplified and in some embodiments may more closely resemble the computing system 900 shown in FIG. 9. It should be noted that both the screen 1004 and the band 1006 are optional.

In one example, the first sensor 1008 comprises a photoplethysmogram (PPG) sensor and the second sensor 1010 comprises an electrocardiogram (ECG) sensor. In examples embodiments, the computing environment 1002 comprises only one of the first sensor 1008 or the second sensor 1010. In yet a further example, the first sensor 1008 and/or the second sensor 1010 are separate from the computing environment 1002 and accessible by means of a separate interface or controller (such as input controller 920 shown in FIG. 9).

The first sensor 1008 and the second sensor 1010 are configured to obtain measurements or signals, e.g., a PPG signal and an ECG sensor, which can be received by one or more processors 1012. The one or more processors 1012 can be any general-purpose processor(s) configured to execute a set of instructions. For example, the one or more processors 1012 can be one or more general-purpose processors, one or more field programmable gate array (FPGA), and/or one or more application specific integrated circuits (ASIC). In one example, the one or more processors 1012 include one processor. Alternatively, the one or more processors 1012 include a plurality of processors that are operatively connected. The one or more processors 1012 are communicatively coupled to the memory 1014 via an address bus, a control bus, and a data bus (not shown).

The memory 1014 can be a random-access memory (RAM), a read-only memory (ROM), a persistent storage device such as a hard drive, an erasable programmable read-only memory (EPROM), and/or the like. The memory 1014 can store information that can be accessed by the one or more processors 1012. For instance, the memory 1014 (e.g., one or more non-transitory computer-readable storage mediums, memory devices) can include computer-readable instructions (not shown) that can be executed by the one or more processors 1012. The computer-readable instructions can be software written in any suitable programming language or can be implemented in hardware. Additionally, or alternatively, the computer-readable instructions can be executed in logically and/or virtually separate threads on the one or more processors 1012. For example, the memory 1014 can store instructions (not shown) that when executed by the one or more processors 1012 cause the one or more processors 1012 to perform operations such as any of the operations and functions for which wearable the computing device 1000 is configured, as described herein. In addition, or alternatively, the memory 1014 can store data (not shown) that can be obtained, received, accessed, written, manipulated, created, and/or stored. The data can include, for instance, the data and/or information described herein in relation to FIGS. 1 to 8. In some implementations, the wearable computing device 1000 can obtain from and/or store data in one or more memory device(s) that are remote from the wearable computing device 1000.

FIGS. 9 and 10 illustrate example systems 900, 1000 that can be used to implement aspects of the present disclosure. These computing systems are not intended to be limiting and other computing systems, and various modifications of example systems 900, 1000, can be used as well. Computing tasks discussed herein can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

It is to be noted that the foregoing description is merely used for enabling the skilled person to understand the present disclosure, without any intention to limit the applicability of the present disclosure to other embodiments which could be readily understood and/or envisaged by the reader. In particular, whilst the present disclosure is primarily directed to the translation of source (stochastic) biological signal to a target (stochastic) biological signal, the skilled person will appreciate that the present disclosure is applicable to other areas of technology involving the translation of stochastic signals having a common or related origin.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

The systems and methods of the present disclosure are applicable to any suitable programming language or environment, including but not limited to Java, C, C++, any suitable assembly language, Python, C#, JavaScript, Ruby, PHP, and the like.

Some aspects described herein may relate to a computer storage product with a non-transitory computer-readable medium (also can be referred to as a non-transitory processor-readable medium) having instructions or computer code thereon for performing various computer implemented operations. The computer-readable medium (or processor readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a transitory computer program product, which can include, for example, the instructions and/or computer code discussed herein.

Some processes/methods described herein can be performed by software (executed on hardware), hardware, or a combination thereof. Hardware modules include, for example, a general-purpose processor, a field programmable gate array (FPGA), and/or an application specific integrated circuit (ASIC). Software modules (executed on hardware) can be expressed in a variety of software languages (e.g., computer code), including C, C++, Java, Ruby, Visual Basic, Python, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, the processes/methods can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method performed by a device for translating a source biological signal output by a sensor to a target biological signal, the method comprising:
   obtain a source biological signal from the sensor;
   deconstructing the source biological signal at the device into a plurality of deconstructed source components;
   performing a transformation at the device on each of the plurality of deconstructed source components to generate a corresponding plurality of transformed source components;
   mapping, from an execution of a plurality of machine learning models at the device, the plurality of transformed source components to a plurality of estimated target components, wherein each of the plurality of machine learning models is trained to map a respective one of the plurality of transformed source components to a respective one of the plurality of estimated target components;
   performing an inverse transformation at the device on each of the plurality of estimated target components provided from the plurality of machine learning models to generate a corresponding plurality of transformed target components;
   generating the target biological signal at the device by combining the plurality of transformed target components; and
   causing an output of the target biological signal from the device.

2. The method according to claim 1 wherein the source biological signal and the target biological signal have a related origin.

3. The method according to claim 1 wherein the source biological signal is a photoplethysmogram (PPG) signal or an electrocardiogram (ECG) signal and the target biological signal is an arterial blood pressure (ABP) signal.

4. The method according to claim 1 wherein the source biological signal comprises an interval of predefined length obtained from a de-noised input signal.

5. The method according to claim 1 wherein the source biological signal is deconstructed into the plurality of deconstructed source components using an empirical mode decomposition.

6. The method according to claim 1 wherein the transformation comprises a Hilbert transform and the inverse transformation comprises an inverse Hilbert transform.

7. A device for cuff-less blood pressure estimation, the device comprising one or more processors, and one or more non-transitory computer-readable media that collectively store instructions that, when executed by the one or more processors, cause the device to perform operations, the operations comprising:
   obtaining, from a sensor, a source photoplethysmogram (PPG) signal at the device;
   transforming, using a first transformation process executed by the device, the source PPG signal into a plurality of PPG components;
   predicting, using a plurality of prediction models executed by the device, a plurality of predicted arterial blood pressure (ABP) components from the plurality of PPG components, wherein each prediction model of the plurality of prediction models is operable to map from one or more PPG components of the plurality of PPG components to a predicted ABP component of the plurality of predicted ABP components;
   transforming, using a second transformation process executed by the device, the plurality of predicted ABP components into a target ABP signal; and causing an output of an estimated blood pressure value based on the target ABP signal.

8. The device according to claim 7 wherein the operations further comprise:
    causing an output of the target ABP signal.

9. The device according to claim 7 wherein the second transformation process is an inverse of the first transformation process.

10. The device according to claim 9 wherein the first transformation process comprises a Hilbert-Huang transform and the second transformation process comprises an inverse Hilbert-Huang transform.

11. The device according to claim 7 wherein the source PPG signal comprises an interval of predefined length obtained from an input PPG signal.

12. The device according to claim 11 wherein the operations further comprise:
    de-noising the input PPG signal prior to the source PPG signal being obtained.

13. The device according to claim 7 wherein the plurality of prediction models comprise a plurality of trained deep learning models.

14. The device according to claim 13 wherein the plurality of trained deep learning models comprise a plurality of trained U-net models.

15. The device according to claim 7 wherein the device is a wearable device.

16. A non-transitory machine readable medium storing executable instructions which when executed by one or more processors of a device cause the one or more processors to perform operations, the operations comprising:
    obtaining a source biological stochastic signal from a sensor;
    generating a first component and a second component from a first transformation performed by the device on the source biological stochastic signal;
    mapping the first component to a first estimated component using a first trained machine learning model executed by the device;
    mapping the second component to a second estimated component using a second trained machine learning model executed by the device;
    generating a target biological stochastic signal from a second transformation performed by the device on the first estimated component and the second estimated component; and
    causing an output of the target biological stochastic signal from the device.

17. The non-transitory machine readable medium of claim 16 wherein generating the first component and the second component from the first transformation comprises:
    decomposing the source biological stochastic signal into a first decomposed component and a second decomposed component;
    generating the first component from the first decomposed component using a first transformation function; and
    generating the second component from the second decomposed component using the first transformation function.

18. The non-transitory machine readable medium of claim 17 wherein generating the target biological stochastic signal from the second transformation comprises:
    generating a first target component from the first estimated component using a second transformation function, wherein the second transformation function is an inverse of the first transformation function;
    generating a second target component from the second estimated component using the second transformation function; and
    combining the first target component and the second target component to reconstruct the target biological stochastic signal.

19. The non-transitory machine readable medium of claim 16 wherein mapping the first component to the first estimated component comprises providing both the first component and the second component as inputs to the first trained machine learning model.

20. The non-transitory machine readable medium of claim 16 wherein the operations further comprise:
    generating a third component from a third transformation performed by the device on the source biological stochastic signal; and
    mapping the third component to a third estimated component using a third trained machine learning model executed by the device;
    wherein the target biological stochastic signal is generated from the first estimated component, the second estimated component, and the third estimated component.

* * * * *